(12) United States Patent
Nowinski et al.

(10) Patent No.: US 11,572,230 B2
(45) Date of Patent: Feb. 7, 2023

(54) PARCEL DISTRIBUTOR, ESPECIALLY FOR STORES

(71) Applicant: Retail Robotics Spolka z.o.o. Sp.K., Bielsko-Biala (PL)

(72) Inventors: Lukasz Nowinski, Bielsko-Biala (PL); Aleksander Gruca, Skawina (PL); Piotr Dawidczyk, Warsaw (PL); Julian Kozankiewicz, Warsaw (PL)

(73) Assignee: Retail Robotics Manufacturing & Services Sp. z o.o., Tychy (PL)

( * ) Notice: Subject to any disclaimer, the term of this patent is extended or adjusted under 35 U.S.C. 154(b) by 0 days.

(21) Appl. No.: 16/987,436

(22) Filed: Aug. 7, 2020

(65) Prior Publication Data

US 2022/0258971 A1 Aug. 18, 2022

(51) Int. Cl.
*B65G 1/04* (2006.01)
*B65G 1/12* (2006.01)

(52) U.S. Cl.
CPC .............. *B65G 1/0435* (2013.01); *B65G 1/12* (2013.01)

(58) Field of Classification Search
CPC ........................... B65G 1/0435; B65G 1/0485
See application file for complete search history.

(56) References Cited

U.S. PATENT DOCUMENTS

| 5,328,316 | A | * | 7/1994 | Hoffmann | B65G 1/0435 414/280 |
| 5,810,540 | A | * | 9/1998 | Castaldi | B65G 1/0435 414/280 |
| 6,024,425 | A | * | 2/2000 | Imai | B65G 1/04 254/338 |
| 6,056,134 | A | * | 5/2000 | Katzenschwanz | B65G 1/0435 414/280 |
| 8,417,373 | B2 | * | 4/2013 | Clo' | B65G 1/1371 700/214 |
| 9,242,810 | B2 | * | 1/2016 | Lõssov et al. | G06Q 10/08 |
| 2020/0062502 | A1 | * | 2/2020 | Kütt | B65G 1/0407 |
| 2020/0361711 | A1 | * | 11/2020 | Must | G07F 17/0064 |

* cited by examiner

*Primary Examiner* — Jonathan Snelting
(74) *Attorney, Agent, or Firm* — John Alumit (57) ABSTRACT

The parcel distributor is a modular set with additional storage module in the form of a ceiling box set on a corner box to which it is rigidly connected and coupled by a cantilever lift mounted in a vertical shaft formed in the support rack frames in both boxes. In each module, between their cantilever racks, there is an electrically driven Cartesian manipulator. On the Cartesian manipulator trolley, there is a grabbing mechanism for taking trays from the front or rear cantilever rack. The window for sending and collecting parcels in the distributor is a locker, preferably in the operating panel, which has an electrically lifted lock cooperating with a ratchet lock and limit switches blocking its lower position when the locker door is open.

7 Claims, 11 Drawing Sheets

PARCEL DISTRIBUTOR, ESPECIALLY FOR STORES

CROSS-REFERENCE TO RELATED APPLICATION

This present application claims the benefit of Polish Application number P.430928 filed Aug. 21, 2019 with the Patent Office of the Republic of Poland. The earliest priority filing date claimed is Aug. 21, 2019.

FEDERALLY SPONSORED RESEARCH

Not Applicable

SEQUENCE LISTING OR PROGRAM

Not Applicable

BACKGROUND

The subject of the invention is a parcel distributor of standardised dimensions and low weight up to max. 7 kg, especially for stores with small exhibition space, known worldwide as convenience stores, in Poland, e.g. stores being part of networks such as Żabka, ABC, Spar. The distributor is an equipment and a piece of furniture in the store, allowing for smart storage of parcels in the corner area and under the ceiling in the store, and is designed for the customer's self-service during sending and collecting parcels through an operating panel visible only from the front of the distributor, having a control panel and a locker door located under, which opens automatically after logging in by the customer on the control panel.

More and more companies in the world offer automatic storage solutions for packaged products with small dimensions and moderate weight, which is extremely important in retail. Stocking automation in trade allows for the optimisation of processes related to the storage and release of goods, as well as improved management of store operation.

A distributor with an access control system for goods placed on automatic shelves of vertical storage elevator racks ensuring complete control of the goods released, is known from the Polish patent description PL221377.

A small element stacking structure with a lifting platform that moves vertically on a guide device and a load carrying device that moves horizontally on a guide device is known form the German solution revealed in the European patent description EP2883831. The stacker crane has a travel mechanism located in the upper and lower end zones of the guide device to move the small element stacker horizontally, with the guide device having two guiding masts separated from each other by a separating partition and the lifting platform placed in the separating partition.

A lever mechanism for opening the locker door is known from the Polish patent description PL221479, which is activated electronically by an alphanumeric code signal or biometric code.

The object of the present invention is to develop a modular construction of a small robotic vertical storage facility, enabling better use of free space in closed rooms, especially in stores.

SUMMARY

The parcel distributor according to the invention has an automated system to control access to parcels placed on shelves and a window for sending and collecting parcels.

The principle of the solution is that the distributor is a modular set with at least one additional storage module in the form of a ceiling box set on a corner box to which it is rigidly connected and coupled by a cantilever lift mounted in a vertical shaft formed in the rack frames in the corner and ceiling boxes. In each module, in both corner and ceiling boxes, between their cantilever racks, there is an electrically driven Cartesian manipulator with a trolley on which there is a gripping mechanism with a transport tray for taking trays from the front or rear cantilever rack. The window for sending and collecting parcels in the distributor is a locker in the operating panel, with height correlated with the storey height of the ceiling box, which has an electrically lifted lock cooperating with a ratchet lock and limit switches blocking its lower position when the locker door is open.

The principle of the solution is also that the distributor is a modular unit with a basic storage module in the form of a corner box and a sending and collecting module in the form of an operating panel, whereby in the corner box, between its cantilever racks, there is an electrically driven Cartesian manipulator with a trolley on which there is a gripping mechanism with a transport tray for taking trays from the front or rear cantilever rack. The window for sending and collecting parcels in the distributor is a locker which has an electrically lifted lock cooperating with a ratchet lock and limit switches blocking its lower position when the locker door is open.

Preferably, the gripping mechanism can be made up of two multi-joint, bendable carrying arms mounted on an extension shaft. The carrying arms are driven via a gearbox by an extension motor mounted under the trolley. A single carrying arm may have two self-aligning carriers with a chain transmission in both carriers and epicyclic gears in the joints of the carrying arm, and each chain carrier of the carrying arm may consist of two pull-out elements with chain wheels and have a chain tensioner in each carrier.

Preferably, the distributor may have a removable and mobile operating panel.

Preferably, on the perimeter from the front, the operating panel may have a lighting shade.

The distributor allows to make full use of the store space, better organise the sales area and ensures safety in the store. Parcels to be collected will always be at one ergonomic height, regardless of the size of the distributor itself.

The distributor provides a smart and automated way of dense storage of small parcels in the store.

With the properly designed tray construction with side walls, parcels do not slip off the tray during the dynamic operation of the Cartesian manipulator.

In the case of variable parcel heights, the program independently optimises the distributor storage space, so that the parcels are stored in programmed spaces that correspond to the real size of the parcel.

The distributor corner box is placed in the corner area of the store, with only a standard width control panel visible. Other distributor modules can be hidden behind furniture and ceiling panels and are therefore invisible to the consumer.

DRAWINGS

Embodiments of the subject of the invention are presented in the drawing where.

DESCRIPTION

Figure 1:
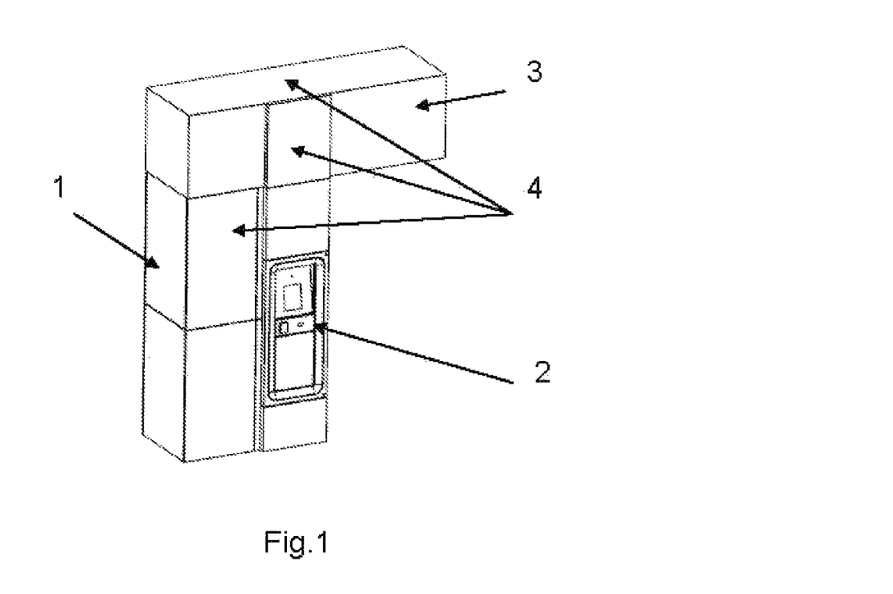
FIG. 1 shows an isometric view of the two-module distributor.
Figure 2:
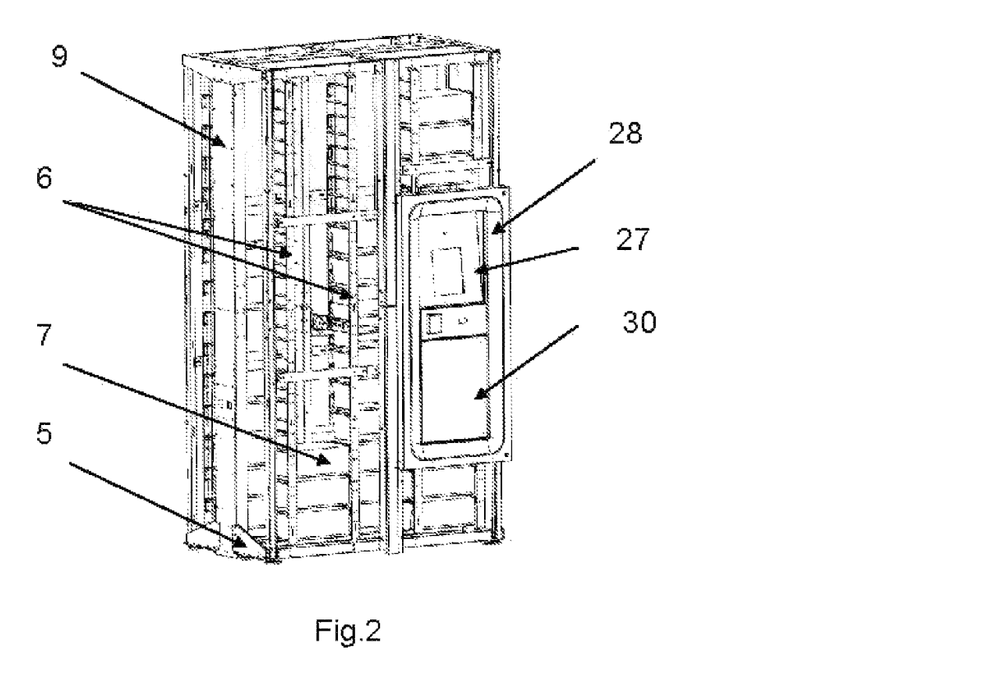
FIG. 2 shows an isometric view of the distributor without covers.
Figure 3:
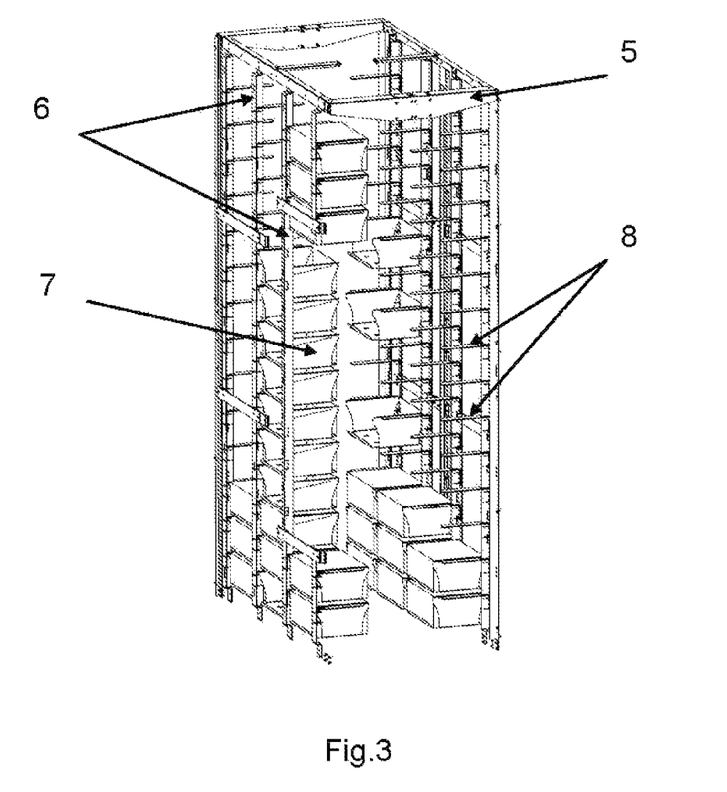
FIG. 3 shows an isometric view of the rack frame.
Figure 4:
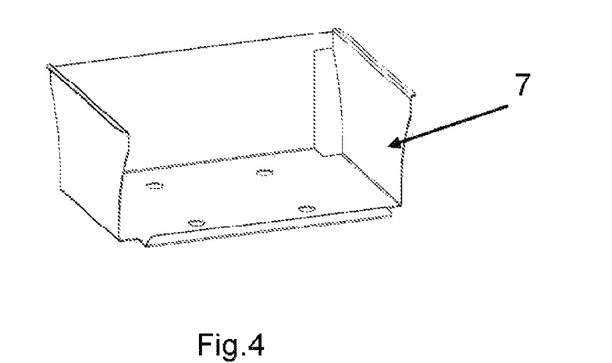
FIG. 4 shows an isometric, front view of the tray.

The parcel distributor is a modular set consisting of a corner box 1 with an operating panel 2, which is the basic module of the distributor, and a ceiling box 3 set on it, which is an additional storage module, rigidly connected to each other, whereby a cantilever lift 22 is embedded in both boxes in the space above the operating panel 2, whose height is correlated with the storey height of the ceiling box 3. Both boxes are in the form of a cuboidal block protected with covers 4, whose frame is a rack frame 5.

Figure 9:
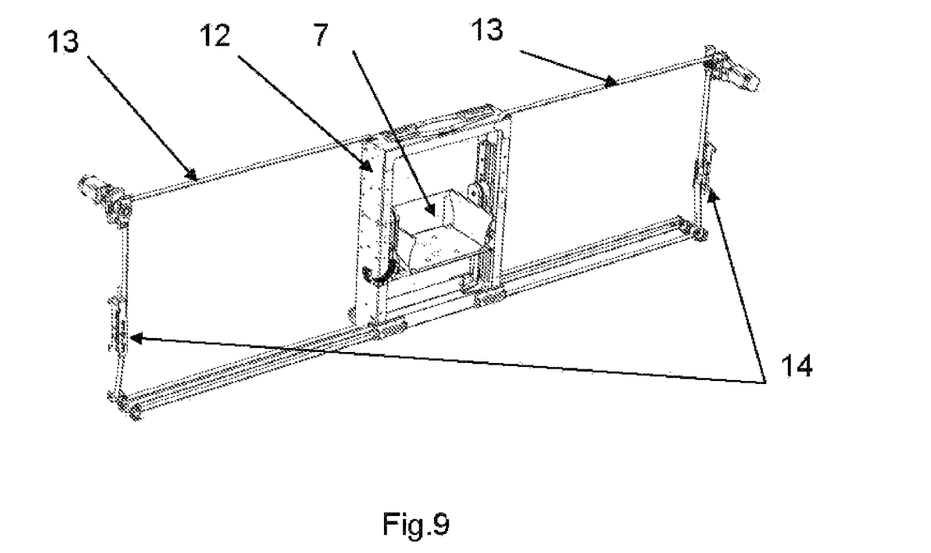
FIG. 9 shows an isometric arrangement of the drive belts routing through the inner frame of the manipulator.
Figure 10:
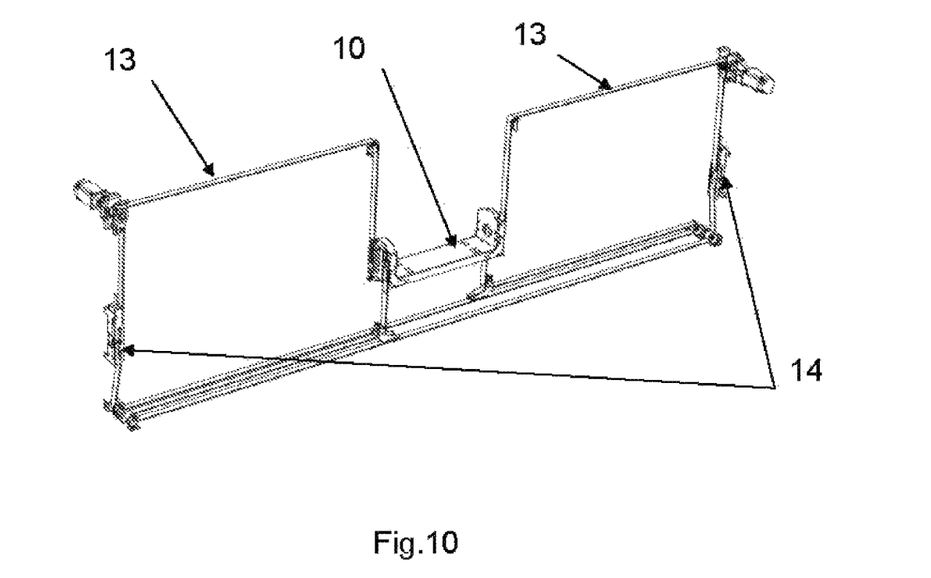
FIG. 10 shows an isometric arrangement of the drive belts fastened to the manipulator trolley.
Figure 11:
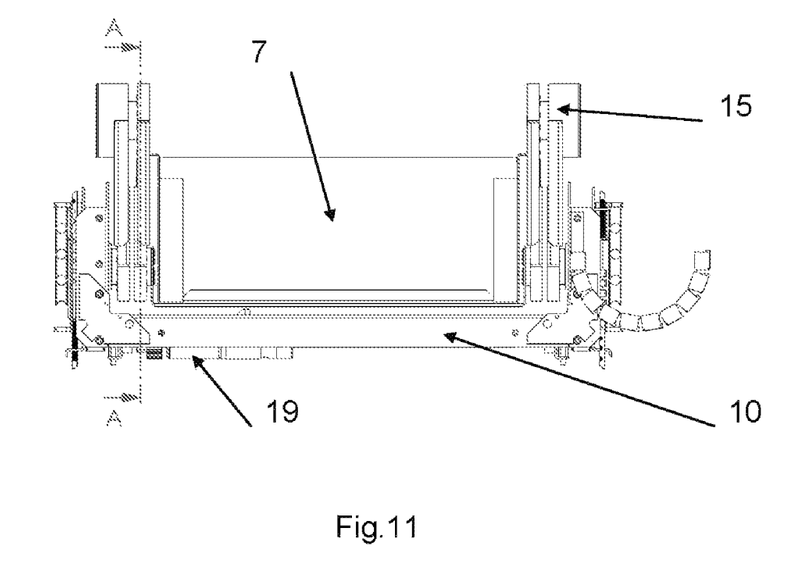
FIG. 11 shows a front view of the manipulator trolley with folded gripping mechanism.

On the front and rear sides of the rack frame 5 there are cantilever racks 6 designed for hanging trays 7 on one side, on which parcels, whose base dimensions are allowed by tray 7, are stored. The spacing between the racks determines the tray 7 suspension column, and the rack brackets 8, arranged in modules at fixed heights, determine the tray 7 suspension storey. Between the cantilever racks 6, there is an electrically driven Cartesian manipulator 9 with a trolley 10 moving in the Cartesian system. The outer frame 11 of the manipulator is stationary and rigidly connected to the rack frame 5, while the inner frame 12 of the manipulator 9 is moving horizontally in the outer frame 11, and the trolley 10 of the manipulator 9 is moving vertically in the inner frame 12. The arrangement of two toothed drive belts 13 routed and fastened to the trolley 10 in the Cartesian manipulator 9, as shown in FIGS. 9 and 10, allows to set its vertical position in a programmed tray 7 suspension column, as well as its horizontal position, on a programmed tray 7 suspension storey. Each drive belt 13 has a belt tensioner 14 attached to the outer frame 11.

Figure 14:
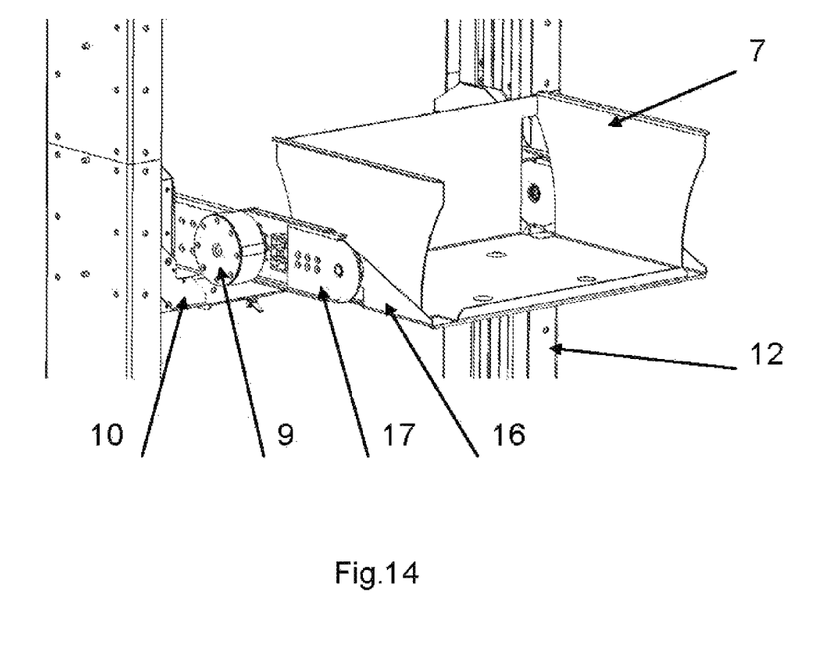
FIG. 14 shows a detailed isometric view with extended gripping mechanism.

On the trolley 10, there is a grabbing mechanism 15, which allows for double-sided extension of the transport tray 16 to take trays 7 from the front or rear cantilever rack 6.

Figure 15:
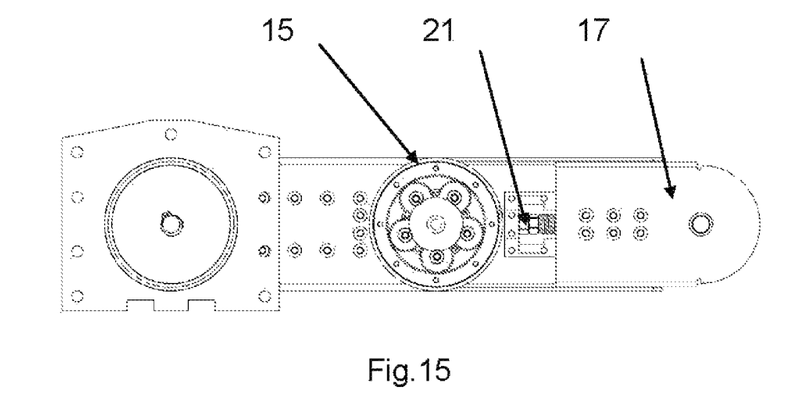
FIG. 15 shows a view of the extended gripping mechanism with extended arms and open epicyclic joint.
Figure 16:
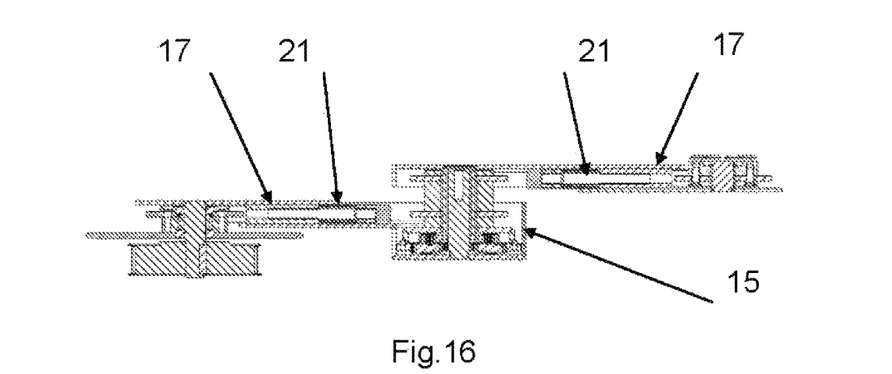
FIG. 16 shows an axial section of the extended gripping mechanism.

The gripping mechanism 15 is made up of two bendable carrying arms 17 mounted on the extension shaft 18 which is driven, through a gearbox, by an extension motor 19 mounted under the trolley 10.

The multi-joint, bendable carrying arm 17 has a two-stage chain transmission. The carrying arm 17 has two self-aligning carriers 20 with a chain transmission in both carriers and epicyclic gears in the joints of the carrying arm 17, which ensures a constant level of the transport tray 16 during its extension to the front or rear cantilever rack 6.

Figure 12:
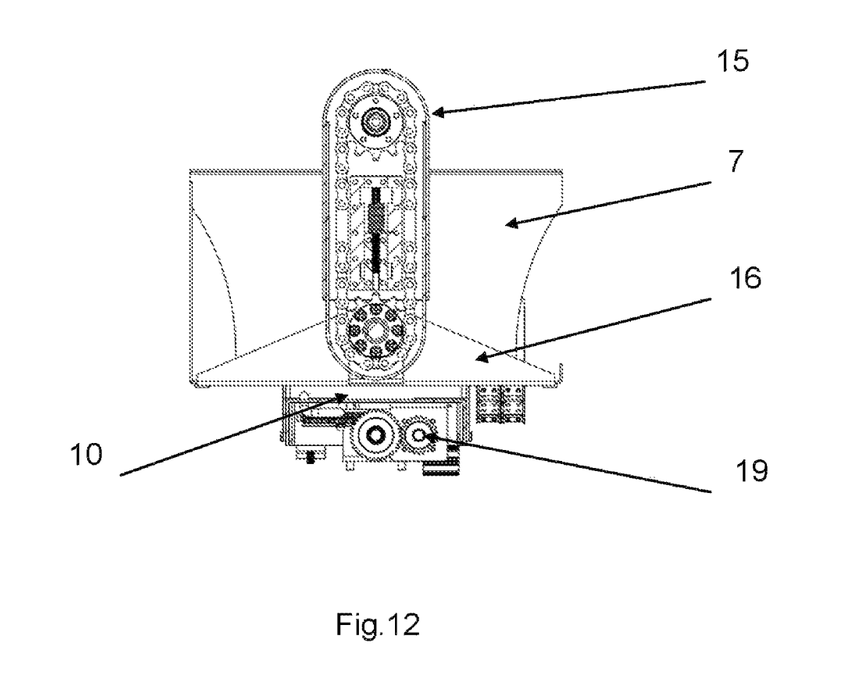
FIG. 12 shows a cross-section of the manipulator trolley designated in FIG. 11
Figure 13:
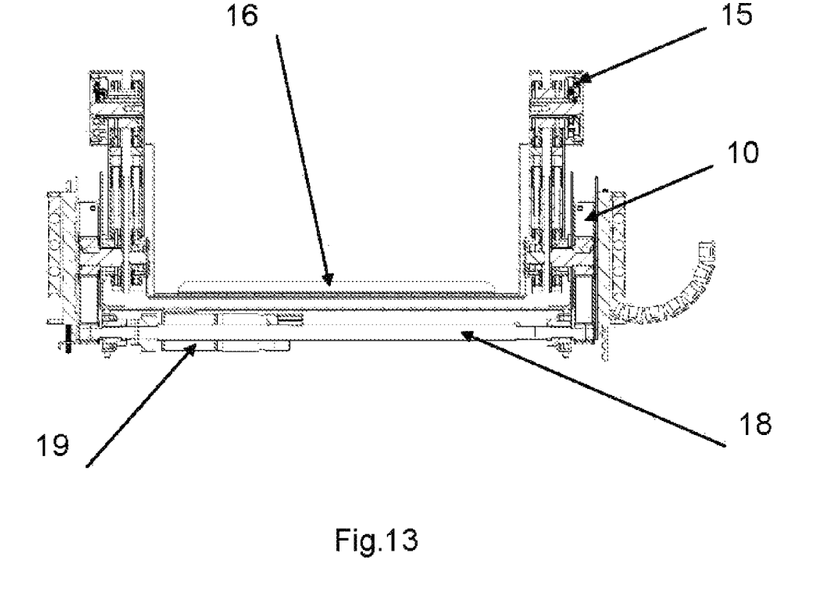
FIG. 13 shows a longitudinal section of the manipulator trolley.
Figure 17:
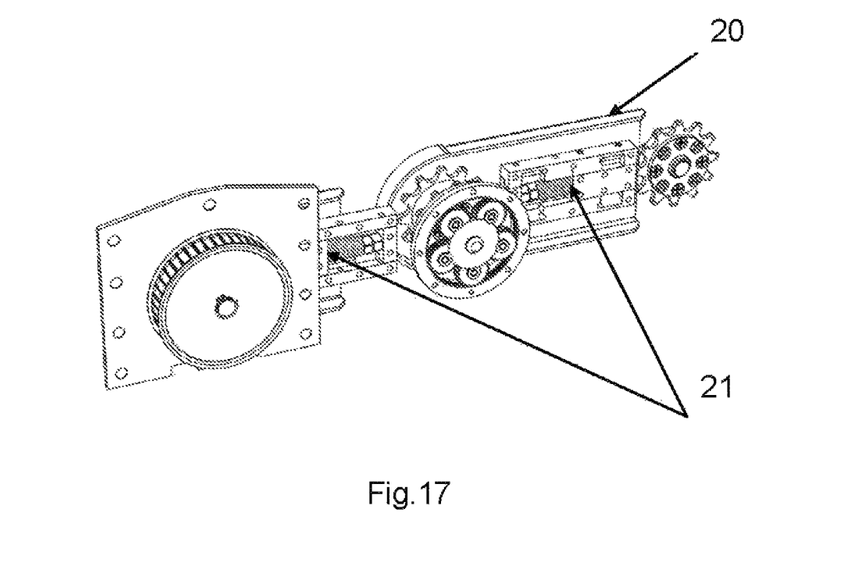
FIG. 17 shows an open isometric view of the extended gripping mechanism with visible chain tensioners.
Figure 18:
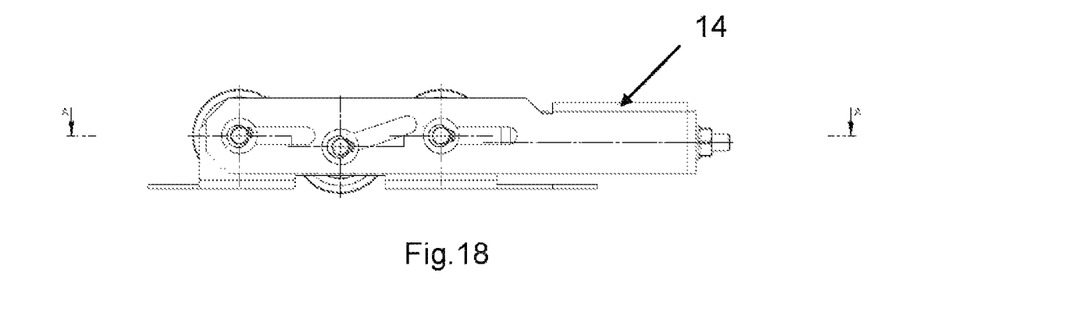
FIG. 18 shows a view of the belt tensioner.
Figure 19:
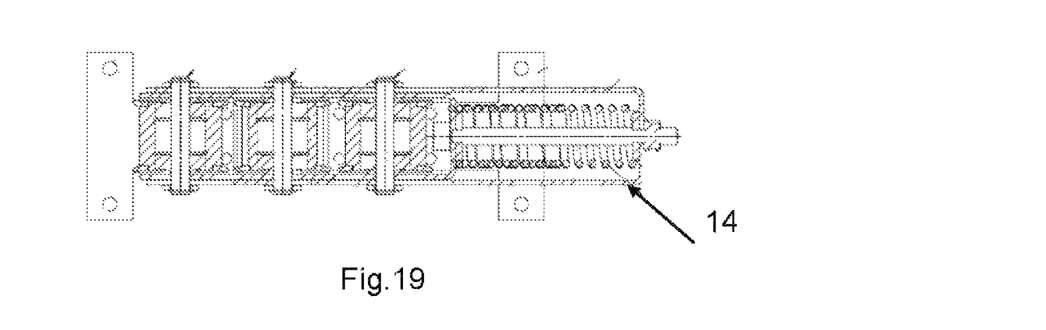
FIG. 19 shows a longitudinal, axial section of the belt tensioner.

Each chain carrier 20 of the carrying arm 17 consists of two pull-out elements with chain wheels and have a chain tensioner 21 in each carrier 20, as shown, e.g. in FIGS. 12 and 17.

Figure 5:
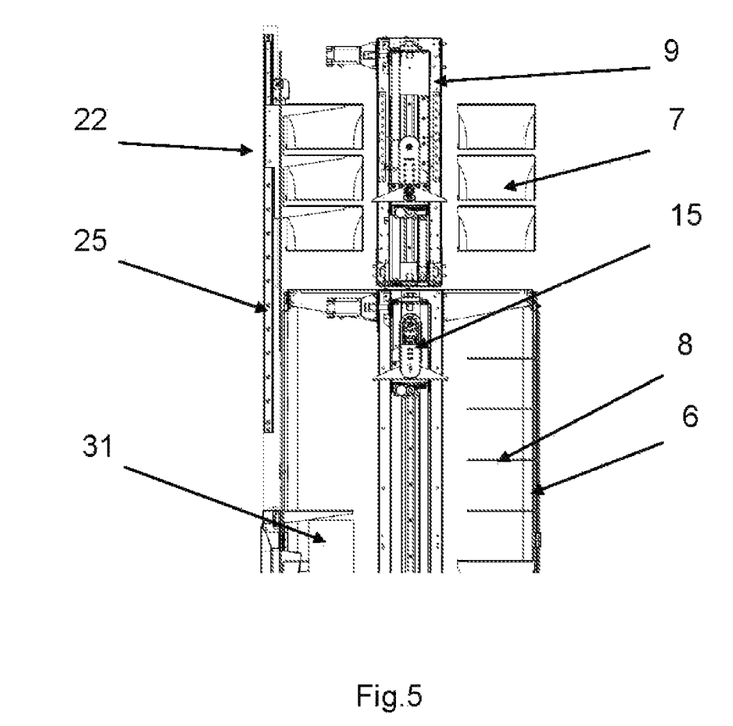
FIG. 5 shows a section of the distributor with cantilever lift in the upper position.
Figure 6:
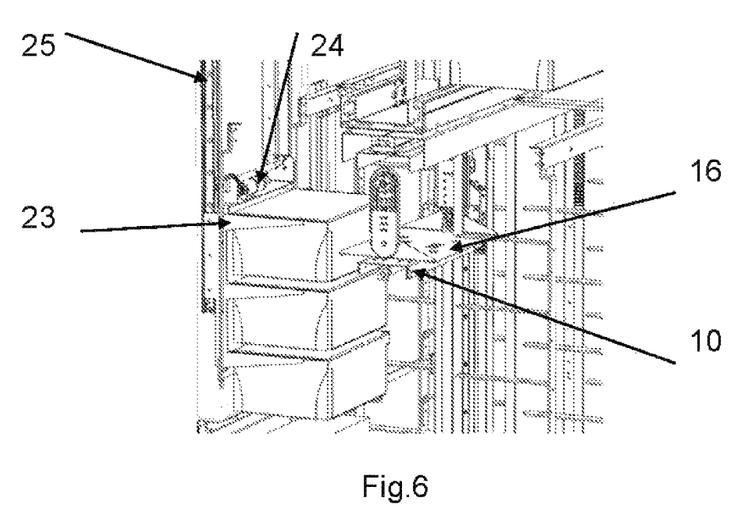
FIG. 6 shows an isometric view with cantilever lift in the lower position.

Lift 22 is mounted in a vertical shaft formed in the front racks 5 in the corner box 1 and in the ceiling box 2. Lift 22 consists of a vertically moving two-cantilever trolley 23 with a lift 22 drive motor 24 attached to it. The trolley 23 moves on two vertical guides 25 attached to the rack frame 5 in the corner box 1 and in the ceiling box 2 of the distributor.

Figure 7:
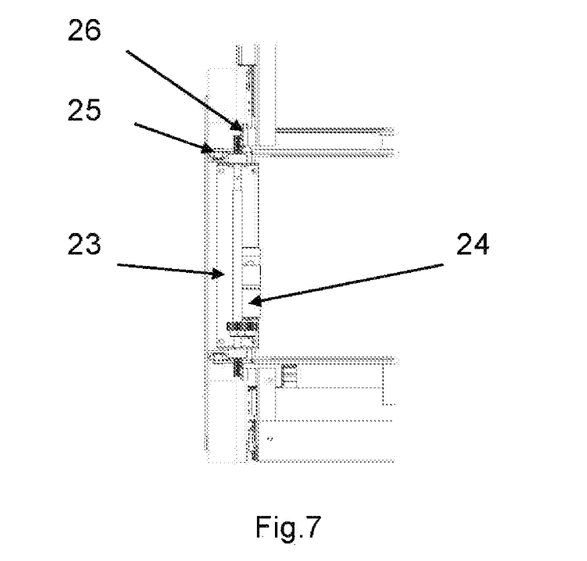
FIG. 7 shows a detailed, top view of the cantilever lift drive.
Figure 8:
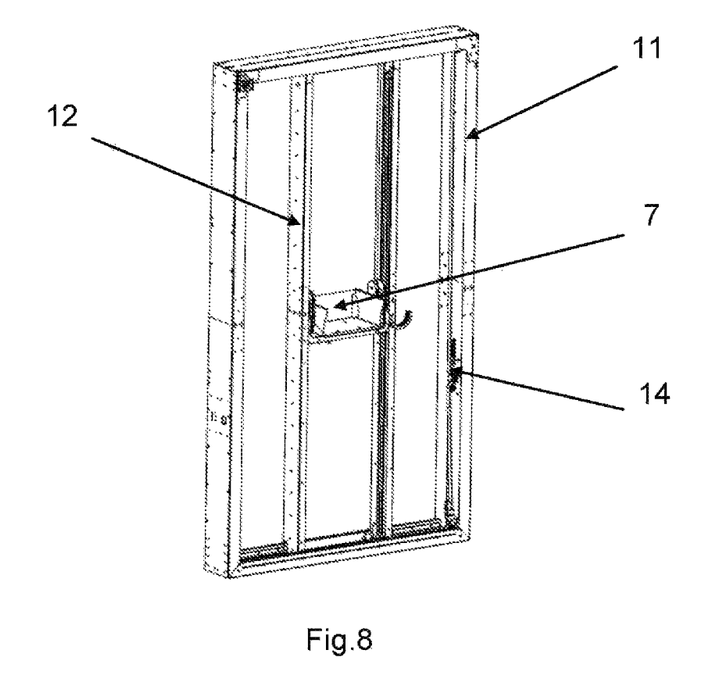
FIG. 8 shows an isometric view of the Cartesian manipulator.

Through gearbox, the drive motor 24 of the lift 22 cooperates with gear racks 26 which are also mounted on the rack frame 5 of the distributor. The lower and upper positions of lift 22 trolley 23 are determined by pinned bumpers and limit switches located on its travel route.

Figure 20:
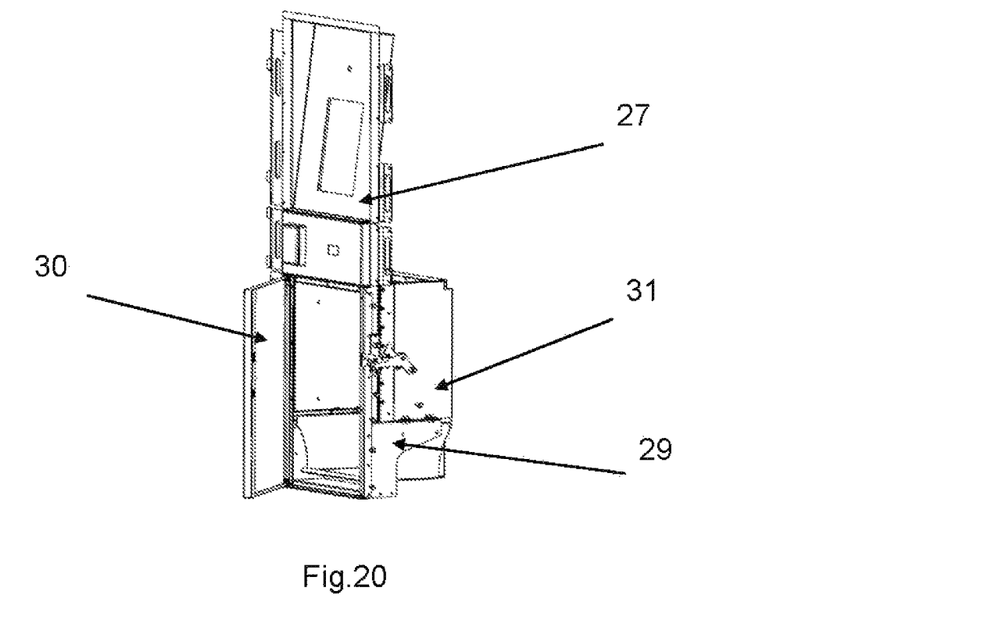
FIG. 20 shows the operating panel with open door and lowered lock.
Figure 21:
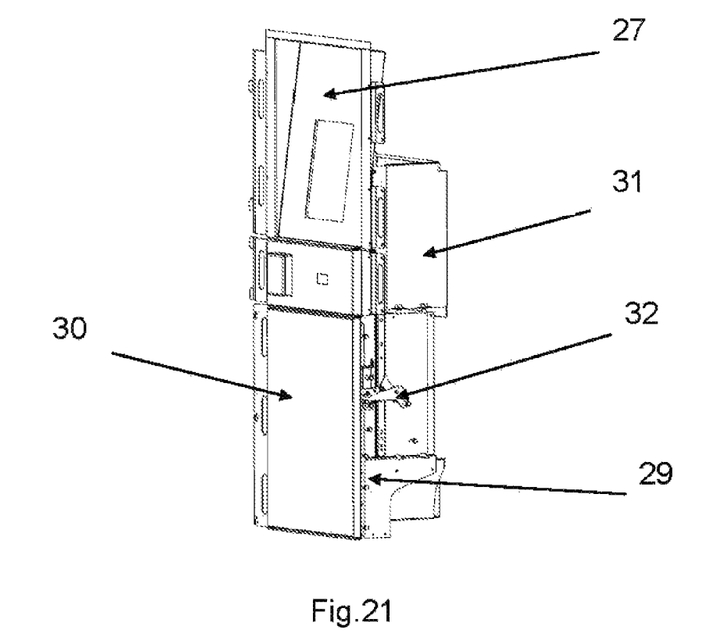
FIG. 21 shows the operating panel with closed door and lifted lock.

The operating panel 2, as an independent sending and collecting module of the distributor, has a lighting shade 28 on the perimeter from the front, with a cord of light-emitting diodes, a control panel 27 at the top, and a locker under it for sending and collecting parcels.

Figure 23:
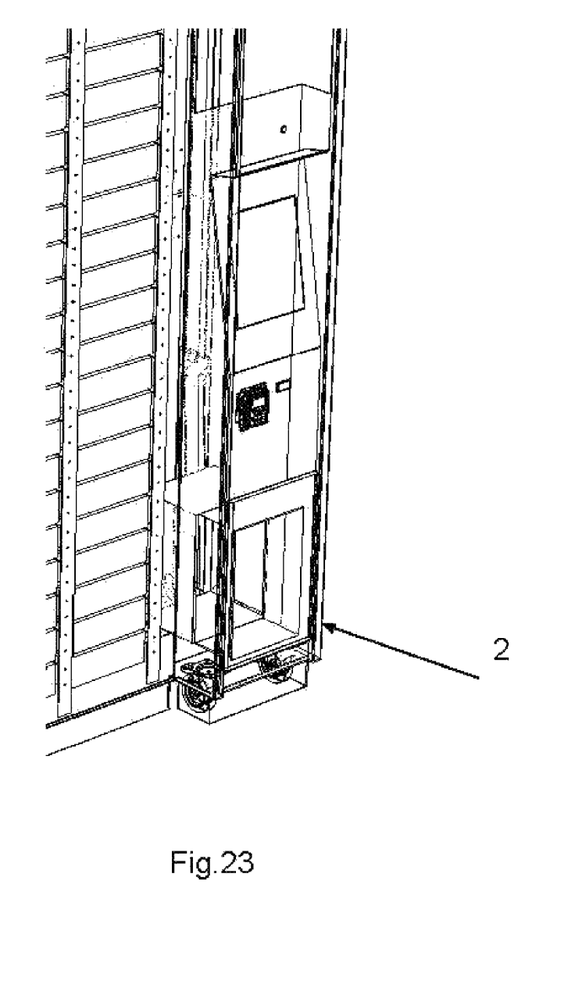
FIG. 23 shows a detailed isometric view of the mobile operating panel.

The operating panel 2 in other version can be a removable and mobile module, as illustrated in FIG. 23.

Control panel 27 consists of the following elements:
touch screen up to 12' to operate the distributor interface
payment terminal
barcode/QR reader for customers and couriers.

The locker constitutes a release window of the distributor and defines parcel dimensions, and the parcel height is correlated with the storey height of the ceiling box 3.

The locker has an open frame compartment with a lower shelf 29 and side guides that lead to the tray 7. At the front, the locker has door 30 that is automatically opened by means of an electromagnetic lock and, at the back, it has an electrically lifted lock 31 cooperating with a ratchet lock 32 and limit switches 33 blocking its lower position when door 30 is open, to prevent unauthorised persons from getting inside the distributor.

Figure 22:
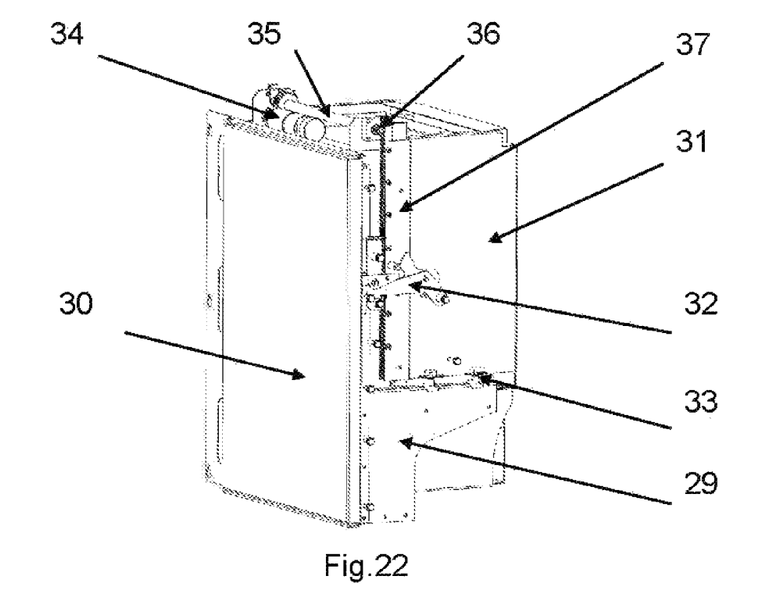
FIG. 22 shows an isometric view of the distributor box with visible lock drive.

The lock 31 is driven by motor 34 which, together with shaft 35, is mounted on the upper wall of the locker. Through gear wheels 36 mounted on its ends, the shaft 35 cooperates with gear racks 37 mounted on the side walls of the lock 31.

On the side of the locker, above its guides, there is a scanner for measuring the actual parcel height, which sends a signal to the system of automatic optimisation of storage space in the distributor.

In the locker, in the shelf 29 guide, there is a sensor for determining the actual parcel weight, which sends an alarm, sound or light signal when the permitted parcel weight is exceeded.

The distributor is controlled via the management software which records the distribution of all parcels and keeps their inventory in real time.

The program selects and sets the free storey for storing the parcel. The gripping mechanism 15 takes tray 7 with a parcel from the locker's release window and moves this tray 7 to the free storey of the cantilever rack 6 and slides the tray 7 with the parcel underneath the other tray 7, while maintaining the programmed gap between the top of the parcel and the bottom of the tray 7.

The distributor can be either corner box 1 with operating panel 2 or a combined modular set consisting of two corner boxes 1, including one, as the basic distributor module, with operating panel 2 as well as the ceiling box 3 rigidly connected to each other.

The ceiling box 3 is mounted above store furniture, under the ceiling, on a self-supporting structure or with wall plugs.

LIST OF DRAWING DESIGNATIONS

1—Corner box
2—Operating panel
3—Ceiling box
4—Cover
5—Rack frame
6—Cantilever racks
7—Tray
8—Rack bracket
9—Cartesian manipulator
10—Trolley
11—Outer frame
12—Inner frame
13—Drive belt
14—Belt tensioner
15—Gripping mechanism
16—Transport tray
17—Carrying arms
18—Extension shaft
19—Extension motor
20—Self-aligning carrier
21—Chain tensioner
22—Lift
23—Two-cantilever trolley
24—Lift drive motor
25—Lift guide
26—Lift gear racks
27—Control panel
28—Lighting shade
29—Locker shelf with side guides
30—Door
31—Lock
32—Door ratchet lock
33—Lock limit switch
34—Lock motor
35—Lock shaft
36—Lock gear wheels
37—Lock gear racks

What is claimed:

1. A parcel distributor for stores, having a system to control access to parcels placed on shelves and a window for sending and collecting parcels characterised in that it said parcel distributor is a modular set with an additional storage module in a form of a ceiling box (3) set on a corner box (1) to which said ceiling box (3) is rigidly connected and coupled by a cantilever lift (22) mounted in a vertical shaft formed in rack frames (5) in the corner box (1) and the ceiling box (3), whereby in each module, both in the corner box (1) and the ceiling box (3), between cantilever racks (6), there is an electrically driven Cartesian manipulator (9) with a trolley (10) on which there is a gripping mechanism (15) with a transport tray (16) for taking trays (7) from a front or rear cantilever rack (6);

WHEREIN the window for sending and collecting parcels in the distributor is a locker whose height is correlated with a storey height of the ceiling box (3), which has an electrically lifted lock (31) cooperating with a ratchet lock (32) and limit switches (33) blockings a lower position of the window when a locker door (30) is open; and WHEREIN the gripping mechanism (15) is made up of two multi-joint, bendable carrying arms (17) mounted on an extension shaft (18), which are driven, through a gearbox, by an extension motor (19) mounted under the trolley (10).

2. The distributor according to claim 1, characterised in that a single carrying arm (17) has two self-aligning carriers (20) with a chain transmission in both carriers and epicyclic gears in the joints of the carrying arm (17), and at least one chain carrier (20) of the carrying arm (17) consists of two pull-out elements with chain wheels and has a chain tensioner (21) in each carrier (20).

3. A parcel distributor for stores, having a system to control access to parcels placed on shelves and a window for sending and collecting parcels characterised in that said parcel distributor is a modular unit with a basic storage module in a form of a corner box (1) and a sending and collecting module in a form of an operating panel (2), whereby in the corner box (1), between cantilever racks (6), there is an electrically driven Cartesian manipulator (9) with a trolley (10) on which there is a gripping mechanism (15) with a transport tray (16) for taking trays (7) from a front or rear cantilever rack (6);

WHEREIN the window for sending and collecting parcels in the distributor is a locker in the operating panel (2), which has an electrically lifted lock (31) cooperating with a ratchet lock (32) and limit switches (33) blocking a lower position of the window when a locker door (30) is open; and WHEREIN the gripping mechanism (15) is made up of two multi-joint, bendable carrying arms (17) mounted on an extension shaft (18) which are driven, through a gearbox, by an extension motor (19) mounted under the trolley (10).

4. The distributor according to claim 3, characterised in that a single carrying arm (17) has two self-aligning carriers (20) with a chain transmission in both carriers and epicyclic gears in joints of the carrying arm (17), and at least one chain carrier (20) of the carrying arm (17) consists of two pull-out elements with chain wheels and has a chain tensioner (21) in each carrier (20).

5. The distributor according to claim 3, characterised in that said mobile operating panel (2) is a removable and mobile.

6. The distributor according to claim 5, characterised in that the operating panel (2) has a lighting shade (28) on a perimeter from a front side.

7. The distributor according to claim 3, characterised in that the operating panel (2) has a lighting shade (28) on a perimeter from a front side.

* * * * *